UNITED STATES PATENT OFFICE.

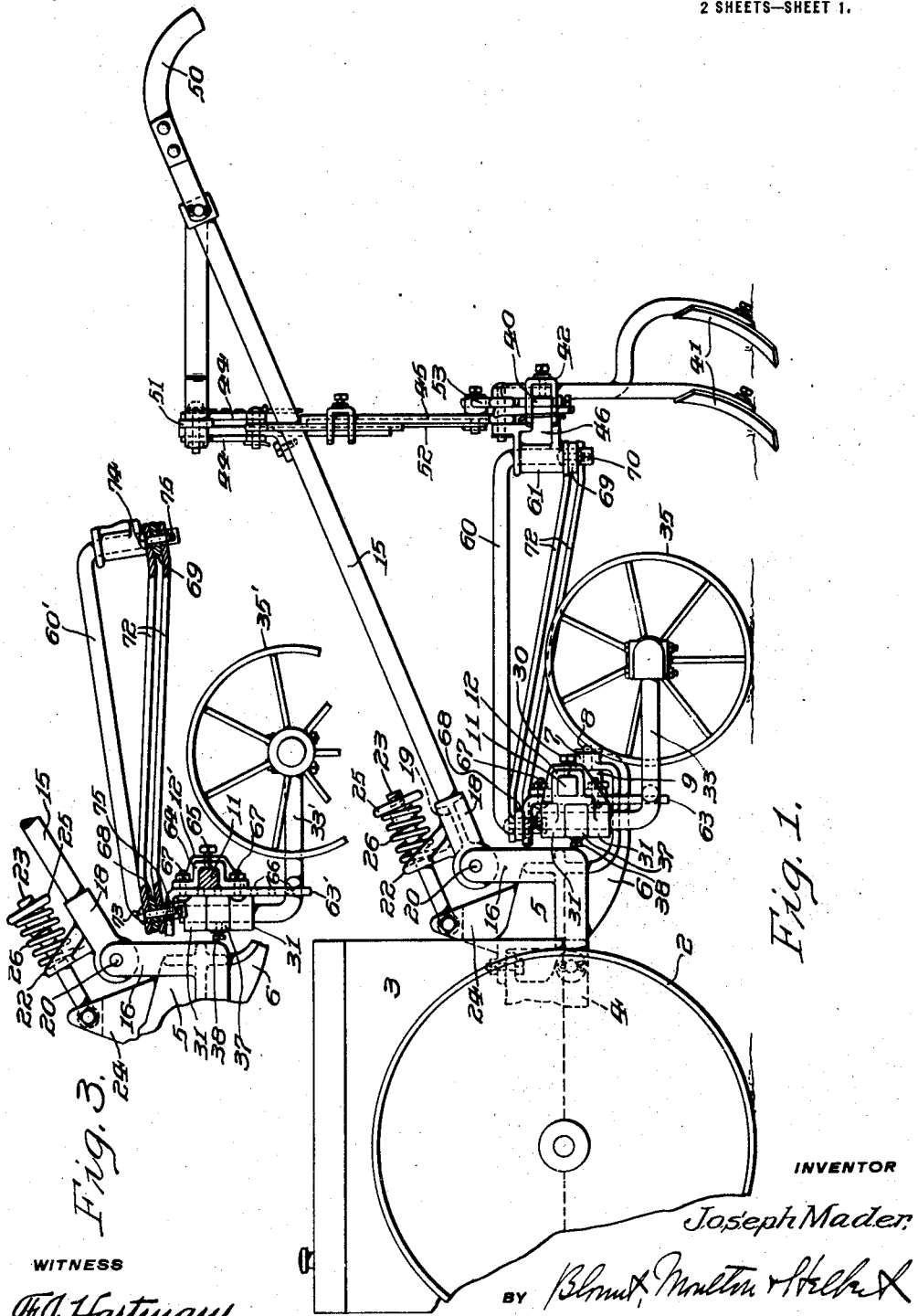

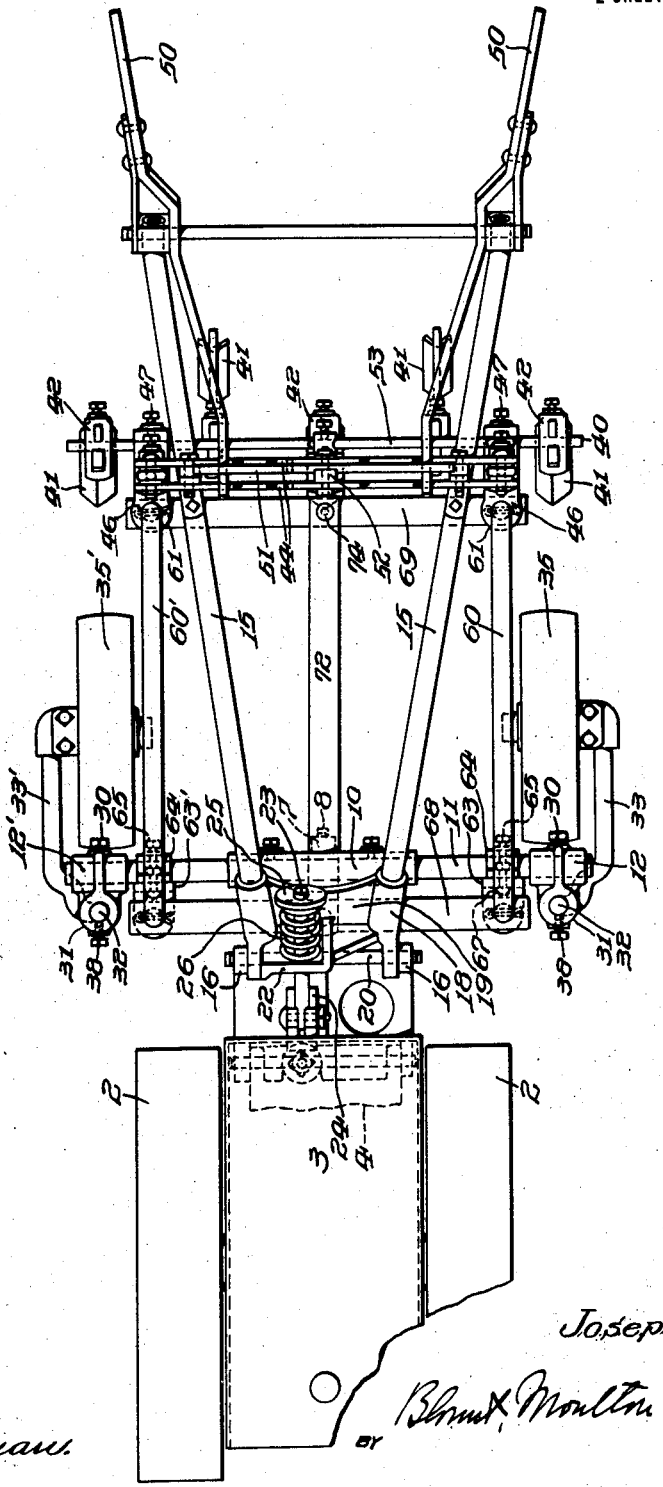

JOSEPH MADER, OF PHILADELPHIA, PENNSYLVANIA, ASSIGNOR TO S. L. ALLEN & CO., INC., A CORPORATION OF PENNSYLVANIA.

AGRICULTURAL IMPLEMENT.

1,391,264.  Specification of Letters Patent.  Patented Sept. 20, 1921.

Application filed June 9, 1920. Serial No. 387,522.

*To all whom it may concern:*

Be it known that I, JOSEPH MADER, a citizen of the United States, and a resident of the city of Philadelphia, in the county of Philadelphia and State of Pennsylvania, have invented certain new and useful Improvements in Agricultural Implements, of which the following is a specification, reference being had to the accompanying drawings.

My invention relates to what are commonly known as garden tractors and more particularly to means for effecting a connection between a ground working implement or the like and the tractor, so that the former will be drawn after the latter in its movement over the ground.

The ordinary type of garden tractor comprises a pair of traction wheels and a power unit supported thereon and suitably connected thereto to effect the rotation thereof, and also comprises a pair of wheels of smaller diameter known as caster wheels located in the rear of the traction wheels and arranged for relative movement with respect thereto. It has been found advantageous to employ caster wheels of relatively large diameter especially when working on uneven ground, since, generally speaking, the greater the diameter of the caster wheels the smaller the amount of power requisite to draw them over an uneven surface. Difficulty has been experienced, however, when utilizing caster wheels of large diameter in effecting a suitable connection with the ground working implement which would not interfere with the motion of the caster wheels in operation as well as their initial lateral adjustment which it is frequently necessary to alter in order to adapt the tractor for the different conditions of operation encountered when the rows of plants are spaced at different widths.

A principal object of my invention, therefore, is to provide means for effecting a draft connection between a garden tractor and a ground working implement which will not interfere with the operation of the caster wheels of the tractor or with their lateral adjustment along their supporting bar; to provide means of this character which will at all times maintain the agricultural implement substantially at right angles to the general direction of movement of the tractor and thereby insure the proper presentation of the ground working tools to the soil and which will permit the ground working implement to be vertically raised and lowered as required. Further objects of my invention are to provide means for effecting a draft connection between a garden tractor and a ground working implement which will be operative to transmit the draft of the tractor to the implement whether the same be maintained centrally of the tractor or shifted laterally with respect to the general direction of travel thereof and which may be utilized in connection with any suitable means for effecting such lateral shifting when and as required; which is simple in construction and arrangement, not liable to get out of order, comprises but a relatively small number of parts, and which may be readily applied to and removed from the tractor.

My invention further includes all of the other various objects and novel features of construction and arrangement hereinafter more definitely specified and described.

While in carrying out the objects and purposes of my invention I may employ various instrumentalities and suitable combinations thereof, I have in the accompanying drawings illustrated a preferred embodiment of means adapted for the purpose and have shown the same in connection with a typical garden tractor and in association with the means for effecting lateral shifting and vertical movement of the ground working implement described and claimed in an application for Letters Patent of the United States filed by Charles J. Allen and Joseph Mader, March 26, 1920, Serial No. 368,842. In the said drawings Figure 1 is a side elevation of the invention as aforesaid, the parts being in normal position, Fig. 2, a top plan view thereof, and Fig. 3, a fragmentary view partially in section and with certain parts removed for the sake of clearness showing one of the draft rods and adjacent parts in the position assumed when the ground working implement is raised through vertical movement of the tractor steering posts.

As the tractor may be of any suitable form and construction, I have illustrated the same somewhat typically in the drawings, in which the same numerals are used to designate corresponding parts in the several figures, but it will be understood that the tractor comprises traction wheels 2 and hood 3 beneath which is located the motor and suitable connections therefrom for rotating the wheels, the motor being carried on a suitable frame or housing 4, to which may be rigidly secured in any suitable manner a rearwardly projecting casting 5.

This casting may be provided with a downwardly and rearwardly extending arm 6 directed upwardly at its outer extremity to provide a boss 7 for the reception of a pivot pin 8 secured in a boss 9 integral with a transversely extending sleeve 10 through which passes a transversely extending wheel bar 11 which serves as a support for the caster wheel supporting brackets 12—12′ and for other purposes hereinafter more particularly described. A pair of preferably rearwardly diverging steering posts 15 is provided and arranged for vertical movement with respect to the main portion of the tractor in any suitable manner. For this purpose the casting may conveniently be provided with a pair of laterally spaced, upwardly directed ears 16 between which is positioned a casting 18 comprising a pair of laterally spaced, rearwardly diverging sockets for the reception of the forward ends of the posts, the sockets being connected by a web 19 and the casting being rotatably supported on the ears 16 by a pivot pin 20 passing transversely through the ears and the casting.

For the purpose of normally yieldingly supporting the weight of the steering handles and their adjacent parts, suitable means may conveniently be provided comprising a bracket 22 integral with the casting 18 and projecting upwardly and outwardly substantially normal to the general direction of the sockets and having an aperture through which a bolt 23, pivoted in a lug 24 integral with the casting 5, is arranged to extend, the aperture being of sufficient size to afford some freedom of movement to the bolt. The outer end of the bolt is threaded for the reception of a flanged stop member 25 between which and the bracket 22 is positioned a coil spring 26, the whole arrangement being such that the steering posts may be yieldingly supported in a vertical plane through the medium of the spring and its attendant parts, the tension of the spring being readily adjustable by screwing member 25 in and out on the bolt.

The particular construction and arrangement of the various parts hitherto described and which is more or less typical of the ordinary form of garden tractor will be readily comprehended by those familiar with the art, and may be modified as desired, since the same forms no part of the present invention.

It will be understood that the sleeve 10 and wheel bar 11 which passes therethrough are preferably mounted either as hereinbefore described or in some other suitable manner for rotation about a horizontal axis parallel with the center line of the tractor, so that the caster wheels which are supported from the bar as hereinafter described, are free to rise and fall in accordance with inequalities in the surface over which they are drawn and that necessarily such other parts as are supported on the bar will follow its oscillatory movement as determined by the vertical movement of the caster wheels. These wheels may be supported from the bar in any suitable manner, conveniently by the brackets 12 which surround the bar and are preferably adjustable thereon, being retained in adjusted position by the set screws 30. Each bracket is provided with a pair of spaced, horizontally projecting lugs 31 centrally bored for the reception of the vertical arm 32 of one of the substantially L-shaped wheel supports 33, 33′, upon the extremities of the horizontal arms of which are suitably mounted the caster wheels 35, 35′. Between the lugs 31 a collar 37 surrounds each arm 32, and is secured in place thereon by a set screw 38, so that while each arm is capable of rotation in the lugs it is prevented from vertical movement with respect thereto. In order to facilitate the movement of the caster wheels over the ground with a minimum expenditure of power, the latter may preferably be made of relatively large diameter, for example, and as shown in the drawing, about one-half the diameter of the traction wheels 2, so that when the tractor is positioned on a horizontal surface the upper part of the rims of the caster wheels will lie considerably above the level of the wheel bar 11, and would therefore interfere with the utilization of connecting means between the tractor and the ground working implement unless said means are of peculiar construction and design and particularly adapted for employment under the conditions just described.

In carrying out agricultural operations a garden tractor is ordinarily employed with a ground working implement of suitable character and construction, and which may, for example, comprise a transversely extending gang bar 40 to which cultivator blades or other ground working tools 41 are preferably adjustably secured by suitable clamps 42. The gang bar in use is positioned beneath the steering posts 15 and is supported therefrom, or from bolts passing through transversely extending members 44 secured thereto, by preferably adjustable hanger rods 45 extending downwardly to the hangers 46 which are clamped to the gang bar by set screws 47. Means are preferably provided for effecting a lateral shifting of the gang bar and ground working tools which means may be of any suitable form and arrangement, such, for example, as are shown and claimed in the application for U. S. Letters Patent, Serial No. 368,842, to which reference has hitherto been made, and which comprise movable handles 59 carried by the steering posts and operative through a transversely extending member 51 and a downwardly depending arm 52 to move a link 53 to pull or push the gang bar to effect lateral displacement of the same, but the particular arrangement, construction and operation of the means for accomplishing this result form no part of the present invention and may therefore be of any suitable form and construction, and may even, under certain conditions, be entirely omitted if desired and the gang bar suitably supported from the steering posts without any provision of means for effecting lateral shifting thereof.

For communicating draft from the tractor to the implement a plurality of preferably horizontally movable draft rods are employed, in the preferred embodiment of the invention two of these rods 60, 60' being utilized. Each of the hangers 46 is provided with a boss 61 having a vertically extending socket therein adapted for the reception of the rear end of one of the draft rods which is bent downwardly substantially at right angles to the main portion of the rod and passes entirely through and is freely movable within the socket. The forward end of each draft rod is also turned vertically downwardly and extends loosely through one of the L-shaped draft rod supports 63, 63', each of which is preferably adjustably secured on the wheel bar 11 by a clip 64 having a set screw 65 engaging the wheel bar. The vertical portion of each support is preferably provided with a plurality of spaced holes 66 for the reception of the bolts 67 which serve to secure the support to the clip, so that vertical adjustment of the former with respect to the wheel bar may be secured by positioning the bolts in different pairs of holes, as may be desired.

A preferably flat, transversely extending bar 68, provided with suitable apertures adjacent its extremities, is positioned preferably above and rests upon the horizontal portions of the supports 63, 63' and is provided adjacent its extremities with apertures for the passage of the downwardly turned forward ends of the draft rods, and a substantially similar bar 69 is positioned beneath the lugs 61 and arranged to receive in suitable apertures formed adjacent its ends, the projecting extremities of the downwardly turned rear portions of the draft rods, cotter pins 70 extending through the draft rods beneath bar 69 serving to support the latter. The bars 68 and 69 are connected by suitable longitudinally extending means relatively movable with respect to both bars and preferably secured to them near their respective centers, said means conveniently comprising a pair of superposed links 72 positioned respectively above and below each of the bars and extending between them, the links being provided adjacent their extremities and the bars adjacent their centers with suitable apertures for the reception of pivot bolts 73, 74 preferably held in position by cotter pins 75 passed through the bolts beneath the lowermost link, the arrangement being such that the bars and links are capable of free relative movement in horizontal planes but are securely tied together, the forward and the rear ends of the draft rods being also respectively transversely tied through the medium of the bars.

With the various parts constructed and assembled substantially as hereinbefore described, it will be evident that the motion of the tractor will be communicated to the ground working implement to draw the same after the tractor without any interference with the function and operation of the caster wheels, the latter being free to swing in any direction under the draft rods whatever may be the position of the latter, and that through the operation of the bars 68 and 69 and their connecting means the strain communicated to the draft rods by the passage of the ground working tools through the soil which would, in the absence thereof, tend to straighten out the bends in the bars and place an undue strain on the several parts, is neutralized and the ground working implement maintained in proper vertical position both when following directly in the wake of the tractor and when laterally shifted with respect thereto through the operation of the shifting mechanism if employed. Moreover, since in operation the draft rods always tend to assume a parallel relation with respect to the general direction of movement of the tractor from which position they are necessarily forced by the operation of the gang bar shifting mechanism, as soon as the said mechanism is released the gang bar will be returned to normal position by the action of the draft rods in tending to assume their normal position. Furthermore, the implement blades may be readily withdrawn from the soil and the gang bar brought to a raised position by a vertical movement of the steering posts, the parts then assuming substantially the position in Fig. 3, with the bar 68 in slightly angular relation to the horizontal portion of the supports 63, the apertures in the latter which receive the downwardly turned ends of the draft rods being preferably of sufficient diameter to permit the requisite movement of the rods therein. It will be understood that the vertical height of the rods may be adjusted by suitable manipulation of the supports 63 and that the latter may be adjusted along the wheel bar 11 and the caster wheels also adjusted with respect thereto as may be required, and as the hangers 46 are also preferably arranged for adjustment along the gang bar, the various parts may be suitably alined and the caster wheels arranged so as to clear the rows of plants upon which the cultivating or other operation is being performed.

While I have herein illustrated and described with some particularity one embodiment of my invention, I do not thereby desire or intend to limit myself specifically thereto as changes and modifications may be made in the arrangement and construction of the various elements as may be required or found desirable to meet the conditions encountered in practice and for other purposes, and to adapt the invention for various types and styles of tractors and ground working implements, without departing from the spirit and scope of the invention as defined in the appended claims.

Having thus described my invention, I claim and desire to protect by Letters Patent of the United States:

1. The combination with a wheeled vehicle having a frame, a transversely extending wheel bar adapted for oscillation in a vertical plane with respect thereto and a pair of caster wheels carried by said bar, of means for effecting a draft connection between an agricultural implement and said wheeled vehicle comprising a plurality of draft rods, means for supporting said rods above said bar and said caster wheels, means for operably connecting said rods and said implement, a transversely extending bar connecting the forward ends of said rods, a transversely extending bar connecting the rear ends of said rods, and a link extending between said bars and pivotally connected thereto.

2. The combination with a wheeled vehicle having traction wheels, a transversely extending wheel bar relatively movable in a vertical plane with respect thereto and a pair of caster wheels carried by said bar, of means for effecting a draft connection between an agricultural implement and said tractor comprising a plurality of draft rods having downwardly turned ends, supports carried by said wheel bar and adapted to receive the forward ends of said rods, sockets carried by said implement and adapted to receive the rear ends of said rods, a transversely extending bar connecting the forward ends of said rods, a transversely extending bar connecting the rear ends of said rods below said sockets carried by said implement, and a movable link connecting said bars and extending substantially parallel to said draft rods.

3. The combination with a machine of the class described having a frame, a transversely extending wheel bar relatively movable in a vertical plane with respect thereto and a pair of caster wheels carried by said bar, of means for effecting a draft connection between an agricultural implement and said machine comprising a plurality of draft rods having downwardly turned ends, supports carried by said bar vertically adjustable with respect thereto and adapted to receive the downwardly turned forward ends of said rods, sockets carried by said implement and adapted to receive the downwardly turned rear ends of said rods, a transversely extending bar connecting the forward ends of said rods and normally resting on said supporting means, a transversely extending bar connecting the rear ends of said rods and positioned below said sockets, and a link extending in parallel relation with said rods, connected adjacent its extremities to said transversely extending bars and movable in horizontal planes with respect thereto.

4. The combination with a machine of the class described having a frame, a transversely extending wheel bar adapted for oscillation in a vertical plane with respect thereto and a pair of caster wheels carried by said bar, of a plurality of vertically adjustable supports carried by said bar, draft rods engaging said supports and extending rearwardly therefrom and horizontally movable with respect thereto, a ground working implement, sockets carried by said implement and adapted to engage said draft rods, transversely extending bars connecting respectively the forward ends of said rods and the rear ends of said rods, and a link arranged in parallel relation with said rods and movably connected to said bars.

5. The combination with a machine of the class described having a frame, a transversely extending wheel bar adapted for oscillation in a vertical plane with respect thereto and a pair of caster wheels carried by said bar, of a pair of vertically adjustable supports carried by and laterally adjustable on said wheel bar, a draft rod adjacent each of said supports extending rearwardly therefrom and having a downwardly turned forward end, a ground working implement having a socket adapted to receive the downwardly turned rear end of each of said rods, the rearwardly extending portion of each rod lying in a plane above the periphery of said caster wheels, a transversely extending member connecting the forward ends of said rods and normally resting on said supports, a transversely extending member connecting the rear ends of said rods and positioned beneath said sockets, and a link positioned in parallel relation with said rods connecting said members and movable with respect thereto, said rods and said link being respectively maintained in parallel relation, and said members being similarly maintained independently of the laterally shifted position of said implement with respect to said tractor.

6. The combination with a wheeled vehicle having a wheel supporting bar supported by and oscillatory in a vertical plane with respect thereto, of means for effecting a draft connection between said vehicle and an agricultural implement comprising a pair of rearwardly extending draft rods supported by said bar and movable with and with respect thereto, transversely extending members connecting the ends of said rods and a link movably secured to said members and disposed between said draft rods and in parallel relation thereto.

7. The combination with a machine of the class described having a wheel supporting vertically oscillatory bar, of means for effecting a draft connection between said machine and an agricultural implement comprising supports carried by said bar, draft rods engaging with and movable with respect to said supports and extending rearwardly therefrom, transversely extending members connecting the forward ends of said draft rods and the rear ends thereof, and a link disposed between said draft rods and pivotally secured to said members, substantially at right angles thereto.

In witness whereof, I have hereunto set my hand this 7th day of June, A. D. 1920.

JOSEPH MADER.